Patented Apr. 28, 1942

2,281,419

UNITED STATES PATENT OFFICE 2,281,419

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, and Bernhard Keiser, Webster Groves, Mo., assignors to Petrolite Corporation, Ltd., Wilmington, Del., a corporation of Delaware No Drawing. Application March 6, 1940, Serial No. 322,537

24 Claims. (Cl. 252—8.55)

This invention relates to the art or procedure commonly referred to as acidization of oil-bearing calcareous strata or the like, and which consists in introducing a strong mineral acid into an oil well for the purpose of causing the acid to disintegrate, dissolve, or re-act with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical or similar treatment, in order to recover the oil or valuable constituent of the emulsion. Our invention has for its main object to prevent the formation of objectionable water-in-oil type emulsions resulting from acidization of oil wells, or stated in another way, one object of our invention is to provide a process or procedure by which the oil-bearing calcareous structure of a well can be acidized to increase the oil production, without danger of the procedure causing the well to produce a product which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent, situation, but even if lasting only for a few weeks, are extremely objectionable.

Another object of our invention is to provide a new composition of matter that is particularly adapted for use in the operation of acidizing the calcareous oil-bearing strata of a well, inasmuch as said composition will re-act with or act upon the calcareous structure in a way to increase the amount of crude petroleum obtainable from said structure, without however, converting said crude petroleum into an objectionable emulsion.

Our new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Said emulsion-preventing agent consists of a glycol or polyglycol ether of the type obtainable by causing a water-insoluble, non-cyclic hydroxy compound characterized by the presence of an acyl radical having at least seven carbon atoms, to re-act with an alpha-beta alkylene oxide, such as ethylene oxide, propylene oxide, butylene oxide, or the like.

In practising our process the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in aqueous solution, immediately after the introduction of the mineral acid.

The composition of matter that we have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Bé. acid, as we have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, we wish it to be understood that our invention, i. e., the new process and composition of matter herein described, is not restricted to the use of hydrochloric acid, but instead, contemplates the use of any suitable "strong mineral acid," several of which have previously been described as being usable in place of hydrochloric acid. Similarly, we wish it to be understood that the new composition of matter herein described may have other or additional uses, such, for example, as in the acidization of oil-bearing strata, which do not produce emulsions. The hydrochloric acid or the like that is employed, may or may not have present other addition agents intended to make the acid particularly adapted to meet localized conditions which sometimes arise in the course of acidization. It should be emphasized that what is said hereinafter as to the utility and effectiveness of the composition of matter herein contemplated applies with equal force and effect to the process which forms part of the present invention.

A number of problems have been involved in the introduction of strong mineral acid into oil-bearing strata of the kind containing calcium carbonate, magnesium carbonate, mixtures of same, siliceous material, or material which is dolomitic in character, and commonly referred to as calcareous structures. One problem is the prevention of corrosion or damage to the metallic working parts of the well into which the acid is introduced. This has been overcome in various ways, such as by the use of an inhibitor. For the sake of brevity, reference is made to the following patents, which give a cross-sectional view of the art relating to acidization, although there are in addition certain other practical elements which are well known:

U. S. Patent No. 1,877,504, Sept. 13, 1932, Grebe and Sanford; 1,891,667, Dec. 20, 1932, Carr; 1,911,446, May 20, 1933, Grebe and Sanford; 1,990,969, Feb. 12, 1935, Wilson; 2,011,579, Aug. 20, 1935, Heath and Fry; 2,024,718, Dec. 17, 1935, Chamberlain; 2,038,956, Apr. 28, 1936, Parkhurst; 2,053,285, Sept. 8, 1936, Grebe; 2,128,160 and 2,128,161, Aug. 23, 1938, Morgan, and 2,161,085, June 6, 1939, Phalen.

As has been previously stated, in the acidization of oil-bearing calcareous strata or the like it has been found necessary, in some instances, to add certain other materials or compounds which give additional desirable effects, at least under certain conditions. For instance, hydrofluoric acid or fluorides have been added to intensify the action of the hydrochloric acid used to treat the well. Possibly this is related to the action of siliceous matter in the calcareous structure. The reason for the addition of inhibitors has been previously indicated. Sometimes it has been desirable to add tenacious foam-producing agents, such as glue, gelatin, or the like. In other instances it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

We have found that the materials or products which we contemplate adding to the hydrochloric acid or the like to produce our new composition of matter, or to act as an emulsion-preventing agent in our new process, do not interfere in any manner with the functional effect of other conventional acidizing addition agents. Of course, any single example may contain no addition agent at all; or it may contain one or more, depending on the particular local conditions and use. As far as we are aware, the herein contemplated compounds which are added to hydrochloric acid or any other suitable mineral acid, such as a mixture of hydrochloric acid and hydrofluoric acid, do not replace other addition agents which have been added for various other purposes. For the sake of brevity, reference will be made to hydrochloric acid, as illustrating any suitable mineral acid. It is understood, of course, that such hydrochloric acid may or may not contain various amounts of hydrofluoric acid.

As previously indicated, the emulsion-preventing agents herein described have the effect of preventing emulsions when an oil well is turned into production after the acidizing operation. Many oil wells are acidized without subsequently producing any emulsions; or the emulsions, if produced, are self-resolving or readily susceptible to any moderate breaking action. However, certain wells, particularly those located in western Kansas and certain wells in Illinois, when acidized by conventional processes, yield particularly refractory emulsions. This is a rather surprizing situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion preventers, in connection with the acidization of subterranean strata.

The most concentrated hydrochloric acid ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid, as produced, at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit, 0.01% to 2.5%. In many instances, the use of between 0.05% and 0.5% represents an acceptable average range.

In actual practice the hydrochloric acid obtained by a person or firm responsible for acidizing operations may be used, in some instance, on oil-bearing strata, which do not form severe or refractory emulsions, and thus no advantage is obtained by adding a composition of the kind herein contemplated in comparison with ordinary acid. Then too, some calcareous oil-bearing strata which produces severe emulsions may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that we employ and without danger of said emulsion-preventing agent interfering with the effectiveness of such other acidization addition products. Likewise, it has been indicated that one need not necessarily employ our emulsion-preventing agent in the form of an addition agent which is added to or mixed with the acid used in the acidizing step. Instead, our emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably employs the same apparatus and procedure used for introducing the acid. For convenience, however, and in the most preferred form, our invention is exemplified by employing as an integral part thereof the composition of matter herein contemplated, to wit, hydrochloric acid or the like, containing, in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid or its equivalent, or they are not soluble in spent brine of the kind previously mentioned, i. e., brine containing roughly equivalent to 20% of calcium chloride and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain which prevent ordinary demulsifiers from being effective. It is possible that the characteristic properties of our new composition of matter herein described, make it adaptable for uses in other arts with which we are not acquainted; but it may be apparent to others. It is also possible that the stable admixture of the kind described, i. e., certain agents dissolved in strong mineral acid, have other properties which we have not investigated, and in view of such properties, such mixture is particularly adaptable for the particular use herein described.

The substances or materials previously referred to as emulsion-preventing agents, which we employ in our new process and in our new composition of matter, are broadly speaking, well-known compounds, but in order that the disclosure of our invention will be complete enough to enable others to practise or make use of our invention, we will give several examples of emulsion-preventing agents and will describe in detail how said agents may be obtained or produced.

Before considering such various examples in detail, it may be well to note another fact which is the basis for including carboxy compounds as the substantial functional equivalents of the hydroxy compounds of the kind described. If a carboxy acid be indicated by the formula R.COOH, then if the compound reacts with ethylene glycol, for example, the reaction may be indicated thus:

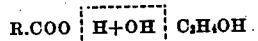

The result of the reaction is a fractional ester or ester alcohol, and thus is just as suitable for treatment with ethylene oxide as the various hydroxylated esters or the like, which will be described subsequently. However, if the acid R.COOH is treated with ethylene oxide, the same final reaction product is formed without the elimination of water, thus:

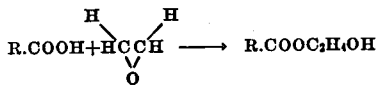

Broadly speaking, the emulsion-preventing agents contemplated by our invention, are obtained by the reaction between an alkylene oxide, or its functional equivalent, and a non-cyclic compound characterized by the presence of a reactive hydrogen atom directly attached to an oxygen atom and containing an acyl radical characterized by the presence of at least seven carbon atoms. Such materials are additionally characterized by being water-insoluble prior to treatment with the selected alkylene oxide.

Types of materials which are suitable for reaction with alkylene oxides include various carboxy acids, hydroxy esters characterized by the presence of a hydroxyl group in the alcohol residue, as in the case of mono-olein, di-olein, etc., or esters characterized by the presence of a hydroxyl group as part of the acyl radical, as in the case of triricinolein, or characterized by the presence of hydroxyl radicals in both positions, as in the case of monoricinolein, diricinolein, etc. Some of the materials previously referred to are readily recognized as being ordinarily referred to as superglycerinated fats. Somewhat comparable to superglycerinated fats are certain hydroxy acylated derivatives of tertiary amines. Examples of this class are the ricinoleic acid ester of dioctyl ethanolamine, or the mono-oleic acid ester of octadecyl diethanolamine.

Another suitable class of materials is an amido type compound, characterized by freedom from an amino hydrogen atom and characterized by the presence of a hydroxyl group in either the acyl radical, as in the amide derived from ricinoleic acid and diamylamine, or a hydroxyl in the amine residue, as in the case of the amide derived from oleic acid and octylethanolamine, or an amide characterized by a hydroxyl in both positions, as the amide derived from ricinoleic acid and octadecylethanolamine. The other "amide" is employed without limitation to the type in which there is only one substituent for an amino hydrogen atom. Thus, amido type of compound is intended to include secondary or tertiary amides and also substituted amides, i. e., amides derived from amines; and the nitrogen atom present is referred to as an amino nitrogen atom. This is purely a matter of convenience, although this nomenclature is frequently employed.

It is obvious that these compounds, which are included for treatment with an alkylene oxide or the like to give the agent contemplated for use in the calcareous acidification vehicle, are obtained by reaction with higher molecular weight carboxy acids that are characterized by having more than six carbon atoms, and generally less than 40 carbon atoms; or to state the matter another way, that the acyl radical must contain at least seven carbon atoms. With this in mind, it may appear well to indicate immediately the various members of the class which may broadly be indicated as "higher molecular weight carboxy acids."

The expression "higher molecular weight carboxy acids" is an expression frequently employed to refer to certain organic acids, particularly monocarboxy acids, having more than six carbon atoms, and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, heptylic acid, caproic acid, capric acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils, such as these mentioned; hydroxy and alpha-hydroxy higher carboxylic, aliphatic and fatty acids, such as hydroxy stearic acid, dihydroxy-palmitic acid, dihydroxystearic acid, dihydroxy-behenic acid, alphahydroxycapric acid, alpha-hydroxystearic acid, alpha-hydroxy palmitic acid, alpha-hydroxy lauric acid, alpha-hydroxy myristic acid, alpha-hydroxy cocoanut oil mixed fatty acids, alpha-hydroxy margaric acid, alpha-hydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl naphthenic acid, and abietic acid; aralkyl and aromatic acids, such as benzoic acid, Twitchell fatty acids, naphthoic acid, carboxy-diphenyl, pyridine carboxylic acid, hydroxybenzoic, and the like.

Other suitable acids include phenylstearic acid, benzoylnonylic acid, campholic acid, fencholic acid, cetyloxybutyric acid, cetyloxyacetic acid, chlorstearic acid, aminostearic acid, carboxydiphenyl acid, quinaldinecarboxy acid, etc.

In some instances obviously certain derivatives of dibasic acids would, in essence, act as if they were simple monocarboxylated acids, for instance, various phthalamic acids derived from phthalic anhydride, and amines, such as aniline, cyclohexylamine, octylamine, etc. Other similar amido acids can be derived by means of other comparable anhydrides. One may also employ materials, such as ethyl ricinoleate monophthalate, etc., and also various acids which are derived from chloracetyl ricinoleic acid and its analogs, by replacing a chlorine atom with a suitable monovalent hydrocarbon or an oxy-hydrocarbon radical. The monocarboxy derivatives of pimelic, sebacic, and other similar acids, may be employed.

Another source of suitable acids are those commonly referred to as lac acids, such, as for example, the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, chlor-, keto-, and amino derivatives. Generally speaking, however, it is always preferable to use the unsubstituted acid, particularly free from substitutients which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc., or estolides derived from blown oils, such as blown castor oil, blown soya bean oil, etc.

Needless to say, the acids themselves need not be employed; but one may readily employ any functional equivalent, such as the anhydride, the acyl chloride, or the like. In some instances, the esters, especially in the presence of a trace or a significant amount of water, act as the acid itself, in that the acid is liberated. Unless specific reference is made to a particular isomer, one may employ any isomer or mixture of various isomers, if the acid or acids are so available.

The preparation of suitable compounds adapted for treatment with an alkylene oxide or the like to yield a suitable flooding agent from the various acids of the kind mentioned, is relatively simple. Reference has already been made to superglycerinated fats. Needless to say, the manufacture of these compounds is well known; and in general, they may be characterized by the following formula: (R.COO)$_m$.T(OH)$_m$ in which R.COO represents a higher molecular weight monocarboxy acid of the kind previously described, R being characterized by containing at least six carbon atoms; T represents a polyhydric alcohol residue; and $m$ represents a small whole number. As to the types of polyhydric alcohols which may be employed and as to the general method of manufacture, reference is made to U. S. Patent No. 2,052,284, dated August 25, 1930, to De Groote. Although the aforementioned patent is concerned primarily with detergent-forming monocarboxy acids, the same procedure is applicable to all the acids previously described. In addition to the specific polyhydric alcohols indicated in said aforementioned De Groote patent, one may also employ the sugar type, such as erythritol, pentaerythritol, pentitols, hexitols, heptitols, etc. Of particular interest are such materials as sorbitol and mannitol and their anhydrides, such as sorbitan, mannitan and mannide. It is to be noted that hydroxylated esters of these last mentioned compounds are available in the open market.

Similarly, as to the preparation of hydroxylated amides, reference is made to U. S. Patent No. 2,078,653, dated April 27, 1937, to De Groote and Keiser. Although this patent is concerned primarily with the production of hydroxylated amides, such as ricinoleoamide, similar amides can be derived from any suitable higher molecular weight carboxy acid of the kind described, provided that it contains an alcoholiform hydroxy. Reference is also made to U. S. Patent No. 2,106,241, dated January 25, 1938, to De Groote and Keiser. The procedure therein employed for manufacture of hydroxylated amides, although concerned primarily with detergent-forming acids, is applicable to all the various higher molecular weight organic acids previously described.

As to the production of esterified tertiary hydroxyamines, reference is made to the following patents: U. S. Patents Nos. 2,167,346; 2,167,347; 2,167,348; and 2,167,349, all dated July 25 1939, and all to De Groote, Keiser and Blair. See also U. S. Patent No. 2,176,702, dated October 17, 1939, to De Groote, Keiser and Blair.

It is to be noted that, although the procedure described in the patents mentioned is concerned largely with fatty acids or detergent acids, or acids derived from blown oils, the same procedure is adaptable in connection with higher molecular weight organic acids of the kind described. It is to be noted, however, that in the present instance, in connection with the process herein described, one is primarily interested in products that are water-insoluble prior to the treatment with the alkylene oxides. This means, for example, that one may use products which are either water-insoluble, or just show limited solubility in water, or rather, show a tendency to be self-emulsifying. One cannot use materials which, prior to treatment with ethylene oxide, are clearly water-soluble, so as to give a solution. Generally speaking, if any of the prior examples give water-soluble products, as, for example, an esterified triethanolamine, then one can readily obtain an analogous water-insoluble product by any one of several modifications or combinations of the same. For instance, one can employ an acid, as, for example, a fatty acid, which has a longer carbon atom chain. Thus, instead of employing caproic acid, one may employ stearic acid; or instead of introducing only one acid radical, one might introduce two, for instance, thus producing an ester from triethanolamine, for example, in which two acyl radicals are introduced. Similarly, instead of using a hydroxylated acid, such as ricinoleic acid, one may use a non-hydroxylated acid, such as oleic acid. Furthermore, water-solubility is decreased by replacing triethanolamine or the like with an amine having a higher molecular weight, without any additional hydroxyl radicals; for example, one might employ tripropanolamine, or tributanolamine, or the like. Likewise, one may employ an amine having fewer hydroxyl radicals, for example, amyl diethanolamine, instead of triethanolamine. Similarly, in the formation of amides, where monoethanolamine or diethanolamine may give a water-soluble product, one might employ monobutanolamine, monohexanolamine, or dibutanolamine, dihexanolamine, or the like. In any event, the introduction of a hydrocarbon radical, such as an octyl or octadecyl radical, into an amine prior to esterification or amidification, also tends to produce water insolubility. In a general way, the introduction of nitrogen atoms or oxygen atoms, tends to increase solubility, while the introduction of hydrocarbon radicals tends to decrease solubility. With this in mind, there is no difficulty in obtaining suitable examples of all the preceding classes which are water-insoluble prior to treatment with an alkylene oxide, and which have at least one acyl radical present, and are characterized by the fact that such acyl radicals contain at least seven carbon atoms, and further, characterized by the presence of a reactive hydrogen atom directly attached to an oxygen atom, said oxygen atom, in turn, being free from any combination with the cyclic carbon atom, thus eliminating from consideration acylated phenols and acylated hydroaromatic alcohols and the like.

As to the other suitable types of materials within the broad category previously described and suitable for treatment with ethylene oxide to give a flooding agent of the kind herein contemplated, attention is directed to the phthalated derivatives described in U. S. Patents Nos. 2,154,422 and 2,164,423, both dated April 18, 1939, to De Groote, Keiser and Blair. See also U. S. Patents Nos. 2,166,431, 2,166,432, 2,166,433, and 2,166,434, all dated July 18, 1939, to De Groote.

As to similar products derived from acylated methylene diamines, reference is made to the following four co-pending applications: Serial No. 273,220, of De Groote, Keiser and Wirtel, filed May 12, 1939; Serial No. 273,223, of De Groote and Keiser, filed May 12, 1939; Serial No. 300,842, of De Groote, Keiser and Wirtel, filed October 23, 1939; and Serial No. 300,845, of De Groote and Keiser, filed October 23, 1939. Such co-pending applications are concerned largely with monocarboxy detergent-forming acids, but obviously the same procedure can be applied to any of the higher molecular weight organic acids previously described. Attention is directed to the fact that the acylated hydroxy ethylene diamines can be treated just the same as acylated triethanolamine. For instance, two moles of diethanolamine can be treated with one mole of formaldehyde to give tetraethanol methylene diamine. Such product can be acylated so as to yield a water-insoluble product by means of a fatty acid or the like; and the product can be subjected to reaction with an alkylene oxide, or can be treated with a polybasic acid or polybasic acid compound containing a fatty acid radical, as described in the last four aforementioned co-pending applications.

Other suitable hydroxylated amines, which may be acylated, are described in co-pending application for patent Serial No. 273,278, of De Groote and Keiser, filed may 12, 1939. For instance, said co-pending application describes amines obtained by converting triethanolamine or the like into an alcoholate and then reacting with a chlorhydrin, such as glycerol chlorhydrin. Such amines include the following types:

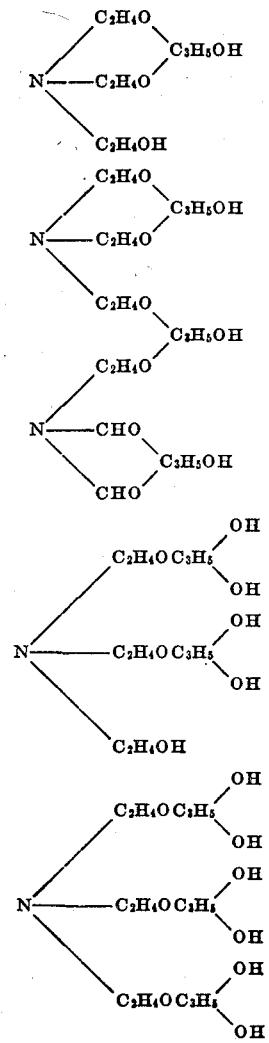

Needless to say, such amines can be acylated in the same manner previously described by any of the higher molecular weight organic acids, so as to yield water-insoluble compounds which are suitable for treatment with an alkylene oxide.

Similarly, the amides containing only one amino hydrogen atom, for instance, the amide derived from lauric acid and amylamine, may be treated with formaldehyde or the like so as to unite two moles to give a water-insoluble diamide. Such diamide may be treated with ethylene oxide or the like to yield a suitable flooding agent.

It is understood, of course, that there is no objection to a non-functional atom or radical of the kind previously referred to in regard to the constitution of suitable higher molecular weight organic acids. Furthermore, there is no objection to the introduction of an acyl radical derived from an acid having less than seven carbon atoms, providing there is always present at least one acyl radical of the kind specified. Furthermore, in some instances it is more desirable to polymerize the ethylene oxide and then unite the same with a selected higher molecular weight organic acid, particularly a fatty acid.

*Example 1*

1.06 kilograms of diethylene glycol are heated to 150° C. in an autoclave and then 8.8 kilograms of ethylene oxide are added a little at a time. The pressure is about 10 atmospheres. After the whole of the ethylene oxide has been introduced, the autoclave is heated until the pressure has practically disappeared. A quantitative yield of a colorless water-soluble condensation product is obtained. A mixture of three parts of the condensation product and one part of oleic or ricinoleic acid is heated to about 130° C., until esterification is complete.

*Example 2*

10 molecular proportions of ethylene oxide are added on to one molecular proportion of the mono-ethyl ether of diethylene glycol ($C_2H_5O.CH_2.CH_2.O.CH_2.CH_2.OH$, obtainable by acting with ethylene oxide on the mono-ethyl ether of ethylene glycol) in the manner, as described in Example 1. 100 parts of the resulting ether are heated with thirty parts of palmitic acid for about 12 hours at 150° C.

*Example 3*

3 parts of a condensation product from one molecular proportion of diethylene glycol and 10 molecular proportions of ethylene oxide are esterified with one part of oleic acid in the manner described in Example 1.

*Example 4*

20 molecular proportions of ethylene oxide are added to the monoethyl ether of diethylene glycol in the manner described in Example 2. 100 parts of the reaction product are heated with 22 parts or slightly less of castor oil, so as to produce a water-soluble product. If water solubility is not obtained, approximately 3-5 additional parts of ethylene oxide are added so as to obtain water solubility.

*Example 5*

A condensation product derived from one molecular proportion of diethylene glycol and 10 molecular proportions of ethylene oxide, as described in Example 1 above, are treated with an equal weight of cocoanut oil fatty acids and heated until condensation is completed. The product should be readily water-soluble; but if not, slightly additional amounts of ethylene oxide may be required.

*Example 6*

The product obtainable by the reaction of 18 molecular proportions of ethylene oxide on one molecular proportion of octadecyl alcohol, is heated with oleic acid, whereby the hydroxyl group at the end of the chain is esterified. A suitable water-soluble product is obtained.

*Example 7*

One part of monoricinolein is heated at 100–150° C. in a closed vessel with approximately 3 parts of ethylene oxide. The resultant product is a water-soluble yellow oil which is suitable for use as a flooding agent.

Example 8

100 parts of diethanololeoamide are treated with approximately 30-70 parts of ethylene oxide at a temperature of 130-170° C. in presence of a small amount of alkali.

Example 9

Diamyl ricinoleoamide is treated in the same manner as described in the previous example.

Example 10

A secondary amide is prepared from two moles of stearic acid and one mole of tris-hydroxymethylaminomethane (trimethylol methylamine). The product thus obtained is treated in the same manner as Example 9 preceding.

Example 11

One part of ricinoleic acid is treated with ethylene oxide at a temperature of approximately 130-170° until a water-soluble product is obtained and the reaction is complete.

Example 12

One part of castor oil is treated with approximately 40 molecular equivalents of ethylene oxide in the manner previously described, so as to produce a water-soluble product.

Example 13

Oleic acid is treated with ethylene oxide in the molar proportions of 26 parts of ethylene oxide to one part of oleic acid under conditions previously described. The product so obtained is water-soluble.

Example 14

The product is made from castor oil in the manner previously described; but instead of using 40 molecular proportions of ethylene oxide for each portion of castor oil, a smaller number of equivalents are employed and propylene oxide is substituted for ethylene oxide.

Example 15

Non-acylated water-insoluble hydroxylated tertiary amines, as, for example, dicyclohexylethanolamine, dioctylpropanolamine, octadecylamylethanolamine and the like, may be treated in a manner comparable to the procedures outlined in previous examples to give suitable emulsion-preventing agents. Similarly, analogous water-insoluble diamines or the like, free from any amino hydrogen atom, may also be employed.

A number of suitable alkylene oxides or their functional equivalents have been previously suggested, but the following may be indicated: ethylene oxide; 1-2 propylene oxide; 1-2 or 2-3 butylene oxide; butadiene oxide; cyclohexane oxide; glycidol, epichlorhydrin; betamethyl glycidol; beta methyl epichlorhydrin; isobutylene oxide and the like.

As is well known, the reaction with ethylene oxide or the like is not limited to the materials of the kind herein described, but alkylene oxides may react with hydrogen atoms linked to oxygen in an ordinary high molecular weight alcohol and with various cyclic alcohols and phenols; or such oxides may react with a hydrogen atom linked to an amido or an amino nitrogen atom. If such other reactive hydrogen atoms are present, then in that event, it is obvious that one may obtain a solubilizing effect, due, in part, to the presence of such other reactive groups. For the sake of simplicity, it is noted that compounds so obtained are contemplated for the same purpose, i. e., preventing water-in-oil type emulsions resulting from acidization of calcareous oil-bearing structures, in our co-pending applications Serial Numbers 323,418 and 322,538, filed March 11, 1940, and March 6, 1940.

No suitable means is available for clearly indicating the chemical structures of the various products of the kind described. It becomes obvious that a number of the compounds may have more than one group which is reactive with ethylene oxide or the like, for instance, triricinolein, various acylated hydroxylated amines, and polyamines, etc. Furthermore, the composition is further complicated by the fact that instead of ethylene oxide, for example, one may use glycidol or the like. Moreover, it is quite possible that the structure of the polymerized alkylene oxide chain or its equivalent, at least in some instances, is not as simple as indicated by the simplest chemical formula which suggests itself. This is based on the well known properties of polyethylene oxide and related compounds, and particularly polymerization products derived from ethylene oxide under various conditions. Reference is made to Chemistry of Synthetic Resins, by Ellis, 1935, chapter 50, and to U. S. Patent No. 1,921,378, dated August 8, 1933, to Webel, and U. S. Patent No. 1,976,628, dated October 9, 1934, to Wittwer. For this reason the previous structural formulas are substituted primarily to show the point of introduction and of the polymerized ether radical or its equivalent, rather than the actual structure itself, although such formulas may be applicable to a number of members of the broad genus. Thus, it would appear best to characterize the products in the hereto appended claims in terms of the method of manufacture, rather than attempt to rely upon structural formulas, in view of what has been said.

In view of the vast number of suitable materials which can be obtained by action of ethylene oxide or the like, it may be well to indicate the preferred class of materials. Of the entire class of high molecular weight organic acids, we prefer to employ those raw materials in which the acyl radical containing more than six carbon atoms is supplied by the monocarboxy detergent-forming acid. More specifically, we prefer the fatty acids as the most suitable group of monocarboxy detergent-forming acids. Of the fatty acids, we particularly prefer the hydroxylated type, such as ricinoleic acid, hydroxystearic acid, diricinoleic acid, and the like. The most suitable specific member is ricinoleic acid. We prefer to use compounds in which there is no other non-functional group present, such as a chlorine atom, alkoxy radical, or the like. Furthermore, our preferred emulsion-preventing agents are derived from suitably fatty acid compounds, particularly ricinoleic acid compounds, which do not contain a nitrogen atom, i. e., an amino nitrogen atom, amido nitrogen atom, or the like. Our preferred reagent is made from ricinoleic acid by means of ethylene oxide, either alone, or in conjunction with a glycol in the manner described.

One of the most desirable types of emulsion-preventing agents is prepared by reacting ricinoleic acid with diethylene glycol and then introducing approximately four to eight moles of ethylene oxide for each mole of fatty acid ester.

However, insofar that such procedure is apt to lead to the introduction at both reactive points, i. e., at both the alcoholic hydroxyl, which is part of the original glycol, and also at the alcoholic hydoxyl, which is part of the acyl radical, one is apt to obtain a more suitable product by reacting one mole of diethylene glycol to approximately 4-8 moles of ethylene oxide in the manner previously indicated, and then esterifying with ricinoleic acid. By this procedure all the ethenoxy groups are introduced in the carboxylic position. This preferred method of conducting the reaction is apt to give the most suitable type of emulsion-preventing agent in the majority of instances.

It is to be noted that some of the previous examples illustrate classes of compounds which are derived by first polymerizing an alkylene oxide, such as ethylene oxide, with a polyhydric alcohol, such as glycerol, ethylene glycol, diethylene glycol, or the like, and then reacting such polymer with a suitable higher molecular weight carboxy acid, and particularly a fatty acid, such as oleic acid or ricinoleic acid. Possibly, such types of materials could be classified conveniently as either glycol ethers or polyglycol ethers derived from carboxy acids of the kind described, or glycol or polyglycol ethers derived from hydroxylated esters. For the sake of convenience, we will consider them as belonging to the latter sub-class, i. e., contemplated within the scope of hydroxylated esters.

It is to be noted, as has been stated repeatedly, that the raw materials, prior to treatment with an alkylene oxide, must be water-insoluble; or at the most, the solubility should be no more than indicated by self-emulsifying properties to produce a suspension or the like. The product, after treatment with ethylene oxide, must be water-soluble, and must be resistant to soluble calcium and magnesium salts.

It is to be noted that, although the treatment with an alkylene oxide or its equivalent is necessary in all instances to produce water solubility, yet excessive treatment should be avoided, in that the compound may become extremely hydrophile. Generally speaking, it is safe to treat the water-insoluble product with ethylene oxide, so as to increase its molecular weight not less than 50%, and generally not more than 200%, although obviously it is difficult to set a hard and fast rule. Such procedure is generally a satisfactory guide. If some other alkylene oxide is employed, for instance, propylene oxide, then of course an increased amount of the alkylene oxide must be employed, based on the increased molecular weight of propylene oxide and the like; and also based on the fact that its solubilizing effect per mole is somewhat less than that of ethylene oxide. If too great an amount of ethylene oxide is used, the resultant product may lose its surface activity. 6 to 18 moles of the alkylene oxide or its equivalent for each acyl radical represents the upper limit. Obviously an acyl radical containing 18 carbon atoms would solubilize very readily; whereas, an acyl radical containing 32 to 40 carbon atoms would solubilize with greater difficulty.

Thus, a more rational guide is that for each carbon atom present in the original water-insoluble material, one must add at least one-third or one-half molecular proportions of the alkylene oxide, if ethylene oxide is used, and possibly a greater amount if an alkylene oxide of higher molecular weight is employed. An oxide such as benzyl ethylene oxide may be employed where the original raw material is almost on the verge of being water-soluble per se. It also must be remembered that the solubility of the product obtained varies somewhat with the method of manufacture and the particular catalyst which is present. It has previously been stated that this is one of the reasons that the exact composition of the compounds cannot be indicated as satisfactorily as might be desired in all instances. If solubility is not obtained with any other alkylene oxide, then ethylene oxide should be employed, because it appears to be best suited, for the reason that it reacts most readily, and because it promotes water solubility to a greater degree than other alkylene oxides or the equivalent. Glycidol, of course, or a similar type of compound, is just as satisfactory as ethylene oxide. In any event, water solubility can always be obtained, and the range of surface activity is such that there is no difficulty in stopping short of the point where surface activity would disappear, due to the presence of unusually excessive hydrophile properties. Oxygen atoms, if present in the parent material (in addition to the required hydroxyl radical or radicals), increase water solubility. If the product becomes water-soluble too easily (i. e., shows insufficient surface activity), repeat the procedure, but use an alkylene oxide of higher molecular weight.

It may be well to emphasize what has been said previously in regard to surface activity of the water-soluble compound. If a dilution of the water-soluble reaction product of one part in 3,000, or one part in 5,000 or 10,000, no longer shows any decrease in the surface tension of the resulting solution, as compared with the raw water from which it was prepared, then one has obtained a water-soluble product from the parent water-insoluble product; but surface activity has been destroyed, due to the introduction of an extremely hydrophilic property. Needless to say, such product should be removed and the changes made in the introduction of the alkylene oxide along the lines previously indicated, so as to obtain a product that is water-soluble and also surface active. In order that it be understood that such extremely hydrophilic compounds are not contemplated for use in the present process, it will be noted that the hereto appended claims are limited to the surface-active type.

It is possible that any residual hydroxyl radical present may be combined with an acid, for instance, a monobasic or polybasic acid, or even a sulfonic acid; and such derivatives may be employed. In such instances it is to be noted that the sulfonic group is not a functional group in the sense that it particularly adds or detracts from the solubility of the compound, but may yield a product having some other desirable property. Similarly, a material like methyl sulfate may be employed to convert a residual hydroxyl to an ether. As has been previously indicated, although such conventional variants may be employed, it is our preference to avoid the use of such type of flooding agent.

Although, as has been previously pointed out, no general formula appears available to characterize all the compounds contemplated, yet perhaps some of the simpler types might be referred to as glycol or polyglycol ethers derived from water-insoluble acylated hydroxy compounds, characterized by the fact that there is present at least one hydroxyl radical as part of an acyl radical, or as part of a carboxyl radical.

or as part of a hydroxy hydrocarbon radical, which, in turn, is a substituent for an amino nitrogen atom or a hydroxyl radical which is part of a polyhydric alcohol or residue; said water-insoluble acylated compound being additionally characterized by the presence of at least one acyl radical containing more than six carbon atoms; and the glycol or polyglycol ether being characterized by containing a radical or residue derived from the water-insoluble products of the kind just described and also containing the group (—O—C₂H₄)ₙ—OX, in which OX denotes a hydroxyl radical, an ether radical, or an ester radical, and $n$ denotes a whole number preferably above 3, generally not over 40, and usually not over 20. Our preference is that OX denote a hydroxyl radical.

All the chemical compounds previously described are water-soluble. For this reason they can be used without difficulty in aqueous solution as an emulsion-preventing agent by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all the compounds above described are soluble in hydrochloric acid of a strength corresponding to approximately 15%. If, in any instance, any of the above compounds do not show solubility in approximately 15% hydrochloric acid, then if they are to be used in admixture with hydrochloric acid, as per our preferred procedure, they should be subjected to a further etherization treatment with an alkylene oxide, such as ethylene oxide, so as to increase their solubility in such hydrochloric acid solution. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22° Bé, corresponding to approximately 35.2% anhydrous acid. Some commercial hydrochloric acid is available in a strength which approximates CP or slightly less than 37% anhydrous acid.

Similarly, if any of the compounds above selected are not soluble in half strength concentrated acid, such solubility can usually be obtained by further etherization of the kind just described.

Needless to say, our new composition of matter can be prepared readily in any convenient manner. The selected compound may be dissolved in concentrated hydrochloric acid, without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 5%.

It is understood that in the hereto appended claims reference to an alkylene oxide broadly, or to a specific member, as ethylene oxide, is intended to include obvious functional equivalents of the kind referred to, to wit, halohydrins, glycidol, epichlorhydrin, and the like. It is also understood that reference in the appended claims to an amino nitrogen atom, refers to either an amino nitrogen atom, or an amido nitrogen atom, or a substituted amido nitrogen atom, i. e., a radical derived from ammonia, characterized by the fact that one of the original hydrogen atoms has been replaced by either an acyl radical or a hydrocarbon radical directly attached.

Having thus described our invention, what we claim as new and desire to secure by Letters Patent is:

1. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting an alkylene oxide with a water-insoluble hydroxylated ester of a higher molecular weight carboxy acid.

2. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting an alkylene oxide with a water-insoluble hydroxylated ester of a detergent-forming carboxy acid.

3. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting an alkylene oxide with a water-insoluble hydroxylated ester of a higher fatty acid.

4. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting an alkylene oxide with a water-insoluble hydroxylated ester of a hydroxylated higher fatty acid.

5. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting an alkylene oxide with a water-insoluble hydroxylated ester of ricinoleic acid.

6. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting an alkylene oxide having at least two carbon atoms and not more than four carbon atoms, with a water-insoluble hydroxylated ester of ricinoleic acid.

7. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting ethylene oxide with a water-insoluble hydroxylated ester of ricinoleic acid.

8. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting ethylene oxide with a water-insoluble hydroxylated ester of ricinoleic acid in which a glycol supplies the alcohol radical.

9. A process for preventing water-in-oil type emulsions resulting from acidization of calcareous oil-bearing strata, which consists in introducing into the cognate fluids of a well prior to emergence, a water-soluble, surface-active alkaline earth-resistant polyglycol ether characterized by freedom from any polybasic carboxy acid radical, and which is derived by reacting ethylene oxide with a water-insoluble hydroxylated ester of ricinoleic acid in which a diethylene glycol supplies the alcohol radical.

10. A process for preventing water-in-oil type emulsions resulting from acidization of calcareous oil-bearing strata, which consists in introducing into the cognate fluids of a well prior to emergence, a water-soluble, surface-active, alkaline earth-resistant polyglycol ether characterized by freedom from any polybasic carboxy acid radical, and which is derived by reacting ethylene oxide with diethylene glycol and then reacting such polymer with ricinoleic acid.

11. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide with a water-insoluble member of the class consisting of non-acylated tertiary amines and hydroxylated esters of higher molecular weight carboxy acids.

12. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide with a water-insoluble hydroxylated ester of higher molecular weight carboxy acids.

13. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide with a water-insoluble hydroxylated ester of a detergent-forming carboxy acid.

14. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide with a water-insoluble hydroxylated ester of a higher fatty acid.

15. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide with a water-insoluble hydroxylated ester of a hydroxylated higher fatty acid.

16. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide with a water-insoluble hydroxylated ester of ricinoleic acid.

17. A composition of matter, comprising hydrochloric acid whose concentration is at least equal to approximately half strength commercial 18° Bé. acid, and comprising a water-soluble, surface-active, alkaline earth-resistant polyglycol ether characterized by freedom from any polybasic carboxy acid radical, and which is derived by reacting ethylene oxide with a water-insoluble hydroxylated ester of ricinoleic acid.

18. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting an alkylene oxide having at least two carbon atoms and not more than four carbon atoms, with a water-insoluble hydroxylated ester of ricinoleic acid.

19. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting ethylene oxide with a water-insoluble hydroxylated ester of ricinoleic acid in which a glycol supplies the alcohol radical.

20. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting ethylene oxide with a water-insoluble hydroxylated ester of ricinoleic acid in which diethylene glycol supplies the alcohol radical.

21. A composition of matter, comprising hydrochloric acid whose concentration is at least equal to approximately half strength commercial 18° Bé. acid, and a water-soluble, surface-active, alkaline earth-resistant polyglycol ether characterized by freedom from any polybasic carboxy acid radical, and which is derived by reacting ethylene oxide with diethylene glycol and then reacting such polymer with ricinoleic acid.

22. A well treating fluid comprising an acid capable of forming water-soluble salts with the earth formation and a small amount of a water-soluble non-ionizing wetting agent obtained by condensing an alkylene oxide with a water insoluble higher molecular weight fatty acid.

23. A well treating fluid comprising an acid capable of forming water-soluble salts with the earth formation and a small amount of a non-ionizing wetting agent obtained by condensing ethylene oxide and ricinoleic acid.

24. A well treating fluid comprising an acid capable of forming water-soluble salts with the earth formation and a small amount of a water soluble non-ionizing wetting agent obtained by condensing an alkylene oxide with a water insoluble polyhydric alcohol ester of a higher molecular weight fatty acid.

MELVIN DE GROOTE.
BERNHARD KEISER.